US009807283B1

United States Patent
Kaiser et al.

(10) Patent No.: US 9,807,283 B1
(45) Date of Patent: *Oct. 31, 2017

(54) METHOD AND SYSTEM FOR SYNCHRONIZING MULTIPLE DATA FEEDS ASSOCIATED WITH A SPORTING EVENT

(71) Applicant: Agile Sports Technologies, Inc., Lincoln, NE (US)

(72) Inventors: Brian Kaiser, Lincoln, NE (US); Kyle Murphy, Lincoln, NE (US); Erik Person, Austin, TX (US); Bryce Kahle, Lincoln, NE (US)

(73) Assignee: Agile Sports Technologies, Inc., Lincoln, NE (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/463,057

(22) Filed: Mar. 20, 2017

Related U.S. Application Data

(63) Continuation of application No. 14/166,594, filed on Jan. 28, 2014, now Pat. No. 9,602,858.

(60) Provisional application No. 61/757,463, filed on Jan. 28, 2013.

(51) Int. Cl.
  *H04N 9/475* (2006.01)
  *H04N 5/04* (2006.01)
  *H04N 21/43* (2011.01)

(52) U.S. Cl.
  CPC ........... *H04N 5/04* (2013.01); *H04N 21/4307* (2013.01)

(58) Field of Classification Search
  CPC ......... H04N 21/25891; H04N 21/2743; H04N 21/8547; H04N 21/4307
  USPC .................. 348/512, 500, 423.1, 425.4, 462; 715/714; 725/18
  See application file for complete search history.

(56) References Cited

U.S. PATENT DOCUMENTS

| 7,605,320 | B2 | 10/2009 | Le et al. |
| 8,301,790 | B2 | 10/2012 | Morrison et al. |
| 8,612,517 | B1 | 12/2013 | Yadid et al. |
| 8,626,504 | B2 | 1/2014 | Radhakrishnan et al. |
| 9,602,858 | B1 * | 3/2017 | Kaiser ................ H04N 21/4307 |
| 2013/0278826 | A1 | 10/2013 | Schlieski |
| 2014/0053214 | A1 | 2/2014 | Walker |

* cited by examiner

*Primary Examiner* — Michael Lee
*Assistant Examiner* — Jean W Desir
(74) *Attorney, Agent, or Firm* — Suiter Swantz pc llo

(57) ABSTRACT

A method for synchronizing multiple data feeds includes receiving a first data feed including user-entered textual data and audio segments acquired concurrently with the user-entered textual data from a first device, receiving an additional data feed including audio segments acquired with the additional device, the first data feed and the additional data feed acquired from a common sporting event, identifying one or more distinctive audio events in the one or more audio segments received from the first device and the additional device, determining a timing offset between the first data feed and the additional data feed by comparing the one or more distinctive audio events of the one or more audio segments received from the first device and the additional device and generating a synchronized output feed by establishing a common absolute time for the first data feed and the additional data feed based on the determined timing offset.

18 Claims, 9 Drawing Sheets

METHOD AND SYSTEM FOR SYNCHRONIZING MULTIPLE DATA FEEDS ASSOCIATED WITH A SPORTING EVENT

CROSS REFERENCE TO RELATED APPLICATIONS

The present application claims the benefit under 35 U.S.C. §120 of U.S. patent application Ser. No. 14/166,594 filed Jan. 28, 2014.

The U.S. patent application Ser. No. 14/166,594 filed Jan. 28, 2014 claims the benefit under 35 U.S.C. §119 of U.S. Provisional Patent Application Ser. No. 61/757,463 filed Jan. 28, 2013.

The U.S. patent application Ser. No. 14/166,594 filed Jan. 28, 2014 and the U.S. Provisional Patent Application Ser. No. 61/757,463 filed Jan. 28, 2013 are hereby incorporated by reference in their entireties.

TECHNICAL FIELD

The present disclosure generally relates to the field of signal processing, and more particularly to a method and system for time-correlating multiple feeds.

BACKGROUND

During the analysis of an event, it is often required to analyze multiple sources of information that all relate to the event. The multiple sources of information may include audio, video and textual data sources. One such event commonly analyzed via audio, video and/or textual data is a sporting event, such as a basketball game, a football game, a volleyball game, a soccer game and the like. In the case of a sporting event, a user or users may acquire a data feed including textual data (e.g., statistical data or notes entered by a user), a video feed including video data associated with the game and an audio feed including audio data associated with the game (e.g., audio track of video feed or audio-only commentator feed).

The matching of the various data feeds is currently a tedious task and includes the manually matching of the various feeds. Commonly, a user must manually match a common moment in time for one feed with the corresponding moment in the other feeds in order to determine the timing offset. As such, it would be advantageous to provide a system and method that cures the defects of the prior art.

SUMMARY

Accordingly, the present disclosure is directed to a method for synchronizing multiple data feeds associated with a common sporting event. In one embodiment, a method for synchronizing multiple data feeds associated with a sporting event may include receiving a first data feed including user-entered textual data and at least one or more audio segments acquired concurrently with the user-entered textual data from a first device. In another embodiment, the method includes receiving at least one additional data feed from at least one additional device including at least one or more audio segments acquired with the at least one additional device, the first data feed and the at least one additional data feed acquired from a common sporting event. In another embodiment, the method includes identifying one or more distinctive audio events in the one or more audio segments received from the first device and the one or more audio segments received from the at least one additional device. In another embodiment, the method includes determining a timing offset between the first data feed and the at least one additional data feed by comparing the one or more distinctive audio events of the one or more audio segments received from the first device to the one or more distinctive audio events of the one or more audio segments received from the at least one additional device. In another embodiment, the method includes generating a synchronized output feed by establishing a common absolute time for the first data feed and the at least one additional data feed based on the determined timing offset.

In an additional aspect, the present disclosure is directed to a method for synchronizing multiple data feeds associated with a common sporting event. In one embodiment, the method includes receiving a first data feed including at least one of user-entered textual data and video data and at least one or more audio segments acquired concurrently with the at least one of user-entered textual data and video data from a first device. In another embodiment, the method includes receiving at least one additional data feed from at least one additional device including at least one or more audio segments acquired with the at least one additional device, the first data feed and the at least one additional data feed acquired from a common sporting event. In another embodiment, the method includes identifying one or more distinctive audio events in the one or more audio segments received from the first device and the one or more audio segments received from the at least one additional device. In another embodiment, the method includes determining a timing offset between the first data feed and the at least an additional data feed by comparing the one or more distinctive audio events of the one or more audio segments received from the first device to the one or more distinctive audio events of the one or more audio segments received from the at least one additional device. In another embodiment, the method includes generating a synchronized output feed by establishing a common absolute time for the first data feed and the at least one additional data feed based on the determined timing offset.

In an additional aspect, the present disclosure is directed to a method for synchronizing multiple data feeds associated with a common sporting event. In one embodiment, the method includes receiving a first data feed including at least one of user-entered textual data, video data and audio data. In one embodiment, the method includes receiving at least one additional data feed including at least one of user-entered textual data, video data and audio data, the first data feed and the at least one additional data feed acquired from a common sporting event. In one embodiment, the method includes identifying matchability of the received first data feed and the at least one additional data feed via a distinctive audio event matching procedure. In another embodiment, upon identification of at least one of the first data feed and the at least one additional data feed as being unmatchable via the distinctive audio event matching procedure, synchronizing the first data feed and the at least one additional data feed based on the media time associated with the first data feed and the media time associated with the at least one additional data feed.

The present disclosure is further directed to a non-transitory computer-readable medium containing program instructions causing one or more processors to carry out a method for synchronizing multiple data feeds associated with a common sporting event.

The present disclosure is further directed to a system for synchronizing multiple data feeds associated with a common sporting event. In one embodiment, the system includes a feed controller including one or more processors and a non-transitory computer-readable storage medium containing program instructions configured to cause the one or more processors to: receive a first data feed from a first device including at least one or more audio segments acquired with the first device; receive at least one additional data feed from at least one additional device including at least one or more audio segments acquired with the at least one additional device, wherein at least one of the first data feed and the at least one additional feed includes user-entered textual data acquired concurrently with one or more audio segments by at least one of the first device and the at least one additional device, the first data feed and the at least one additional data feed acquired from a sporting event; identify one or more distinctive audio events in the one or more audio segments received from the first device and the one or more audio segments received from the at least one additional device; determine a timing offset between the first data feed and the at least an additional data feed by comparing the one or more distinctive audio events of the one or more audio segments received from the first device to the one or more distinctive audio events of the one or more audio segments received from the at least one additional device; and generate a synchronized output feed by establishing a common absolute time for the first data feed and the at least one additional data feed based on the determined timing offset. In another embodiment, the system includes an output device configured to receive the synchronized output feed and display the synchronized output feed.

In an additional aspect, the present disclosure is directed to a system for synchronizing multiple data feeds associated with a common sporting event. In one embodiment, the system includes a first device configured to acquire user-entered textual data concurrently with one or more audio segments of a sporting event. In another embodiment, the system includes at least one additional device configured to acquire at least one or more additional audio segments of the sporting event. In another embodiment, the system includes a feed controller including one or more processors and a non-transitory computer-readable storage medium containing program instructions configured to cause the one or more processors to: receive a first data feed from the first device including the acquired user-entered textual data and the at least one or more audio segments; receive at least one additional data feed from the at least one additional device including the acquired at least one or more additional audio segments; identify one or more distinctive audio events in the one or more audio segments received from the first device and the one or more additional audio segments received from the at least one additional device; determine a timing offset between the first data feed and the at least an additional data feed by comparing the one or more distinctive audio events of the one or more audio segments received from the first device to the one or more distinctive audio events of the one or more audio segments received from the at least one additional device; and generate a synchronized output feed by establishing a common absolute time for the first data feed and the at least one additional data feed based on the determined timing offset. In another embodiment, the system includes an output device configured to receive the synchronized output feed and display the synchronized output feed.

It is to be understood that both the foregoing general description and the following detailed description are exemplary and explanatory only and are not necessarily restrictive of the present disclosure. The accompanying drawings, which are incorporated in and constitute a part of the specification, illustrate subject matter of the disclosure. Together, the descriptions and the drawings serve to explain the principles of the disclosure.

BRIEF DESCRIPTION OF THE DRAWINGS

The numerous advantages of the disclosure may be better understood by those skilled in the art by reference to the accompanying figures in which.

DETAILED DESCRIPTION

Reference will now be made in detail to the subject matter disclosed, which is illustrated in the accompanying drawings.

Referring generally to FIGS. 1A through 6, a system and method for synchronizing multiple data feeds associated with a common sporting event is described in accordance with the present invention. In some embodiments, the present invention provides for a system and method for time-correlating multiple feeds of information based on distinctive audio events, or moments, contained within each of the received feeds of information. In this regard, the present invention may allow for the combination of two or more data feeds acquired with two or more devices recording data (e.g., video data, audio data, textual data or a combination thereof) from a single event. In this regard, the present invention may utilize distinctive audio events found in the audio feed retrieved from each device and synchronize the various data feeds (i.e., establish a common absolute time between all device feeds) based on the identified distinctive audio events. As a specific example, described in greater detail further herein, the audio feeds acquired from the data acquisition devices of the present invention may be analyzed by targeting sounds, which serve as a convenient time marker at a given sporting event. For example, in the case of a basketball game, received audio data feeds from the various devices of the present invention may be analyzed by targeting the audio frequencies common to a referee's whistle (e.g., Fox 40 whistle commonly used by officials), which emits sound at approximately between 3.5 and 4.5 kHz. In the case of a referee's whistle, for example, the audio analysis provided by the present invention may generate a "whistle signature" for each feed. The whistle signatures of the various data feeds are then correlated with one another in order to time-match data from one device to data of one or more additional devices. This ability enables a user (e.g., coach, player, fan, analyst, and the like) to quickly watch video related to a specific stat or set of stats (e.g. a specific made basket, a specific offensive rebound, or all made three-point shots). The present invention also allows a user to watch the game in conjunction with a constantly-updating feed of statistics related to the current moment in the game as displayed.

Figure 1A:
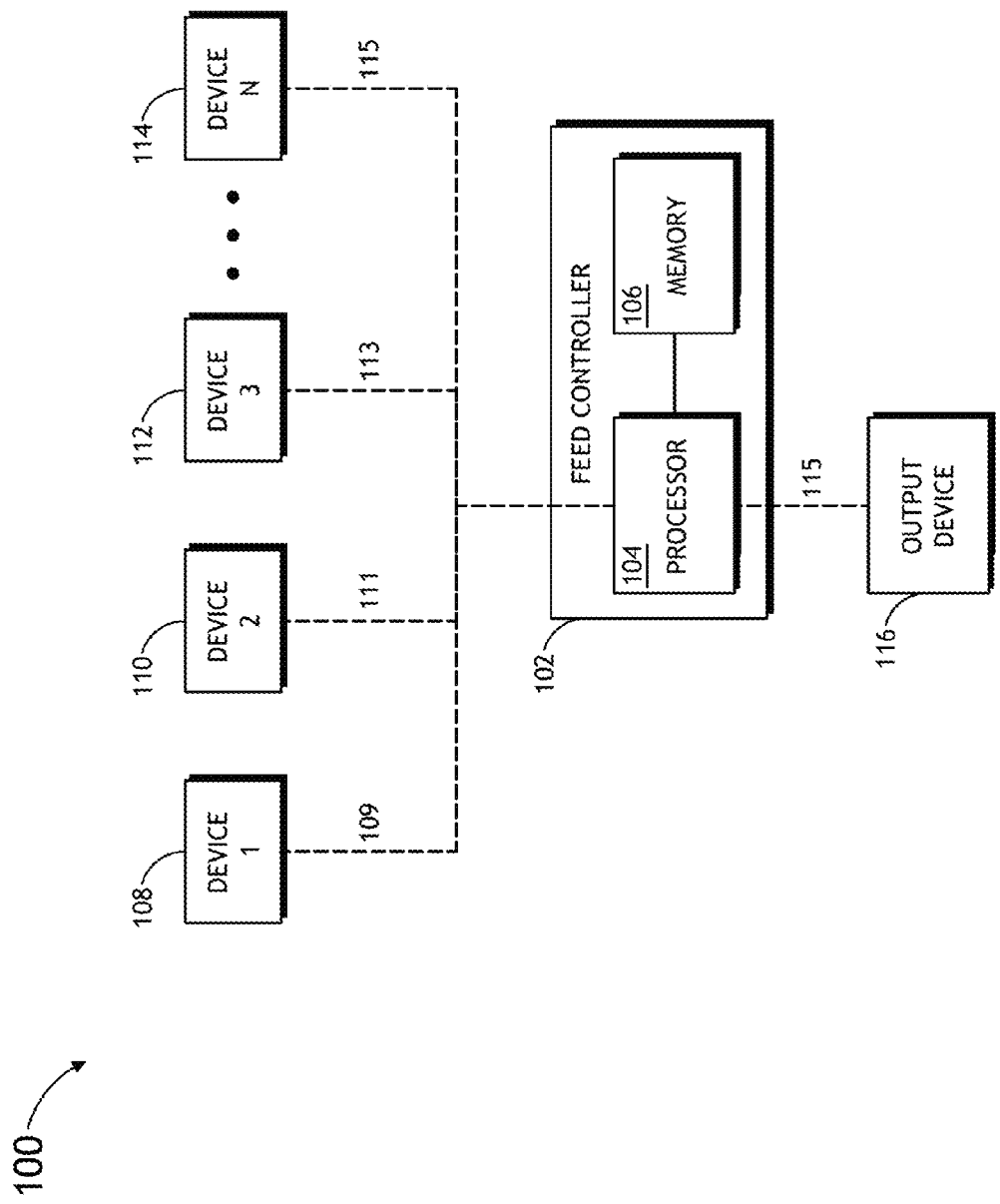
FIG. 1A illustrates a block diagram view of a system for synchronizing multiple data feeds associated with a sporting event in accordance with an embodiment of the present disclosure.

FIG. 1A illustrates a block diagram view of a system 100 for synchronizing multiple data feeds associated with a common sporting event, in accordance with one embodiment of the present invention. In one embodiment, the system 100 includes a feed controller 102 equipped with one or more processors 104. In another embodiment, the feed controller 102 includes a non-transitory storage medium 106 (i.e., memory medium) suitable for storing program instructions that when executed cause the one or more processors 104 to carry out the various steps described through the present disclosure.

In one embodiment, the one or more processors 104 of the feed controller 102 are configured to receive a first data feed including user-entered textual data (e.g., user-entered statistical data, user-entered notations and the like) and one or more audio segments acquired concurrently with the user-entered textual data from a first device. In another embodiment, the one or more processors 104 are configured to receive at least one additional data feed from one or more additional devices including one or more audio segments acquired with the additional device. In another embodiment, the one or more processors 104 of the feed controller 102 are further configured to identify one or more distinctive audio events in the one or more audio segments received from the first device and the one or more audio segments received from the at least one additional device. In another embodiment, the one or more processors of the feed controller 102 are further configured to determine a timing offset between the first data feed and the at least one additional data feed by comparing the one or more distinctive audio events of the one or more audio segments received from the first device to the one or more distinctive audio events of the one or more audio segments received from the at least one additional device. In another embodiment, the one or more processors of the feed controller 102 are further configured to generate a synchronized output feed by establishing a common absolute time for the first data feed and the at least one additional data feed based on the determined timing offset.

In one embodiment, the distinctive audio events of the present invention may include, but are not limited to, any audio events native to a sporting event. For example, the distinctive audio events of the present invention may include, but are not limited to, a whistle (e.g., Fox 40 whistle), a horn, a buzzer, a voice of a player or referee, crowd noise (e.g., crescendo in crowd noise after a specific play), a starting gun alert or sporting equipment sounds (e.g., sporting equipment impact). Sporting equipment sounds may include, but are not limited to, the sound of a diving board hitting a fulcrum, a golf club hitting a golf ball, a baseball bat hitting a baseball, an athlete making impact with a mat or other surface, a gymnast hitting a springboard and the like. It is noted herein that any sound generated during a sporting event that has adequate duration, amplitude and frequency characteristics to allow it to be isolated and process via the various steps of the present invention may be suitable for utilization as a distinctive audio event in the context of the present invention.

In one embodiment, the one or more processors 104 of the feed controller 102 are configured to receive a data feed from two or more devices, each device having acquired the feed data from a common sporting event. For example, a first device 108, a second device 110, a third device 112 and up to, and including, an Nth device 114 may acquire data from a common sporting event. Further, a first device 108 may transmit a first data feed 109 to the feed controller 102, a second device 110 may transmit a second data feed 111 to the feed controller 102, a third device 112 may transmit a third data feed 113 to the feed controller 102 and up to and including an Nth device 114 may transmit an Nth data feed 115 to the feed controller 102.

In another embodiment, each of the feeds 109-115 acquired by devices 108-114 include audio data corresponding to one or more portions of the common sporting event. In one embodiment, the audio data recorded by one or more of the devices 108-114 is a core part of the input data of the given device. For example, the audio data recorded by one or more of the devices 108-114 may include audio associated with a video recording. By way of another example, the audio data recorded by one or more of the devices 108-114 may include an audio-only recording, such as, but not limited to, a commentator recording.

In another embodiment, the audio data recorded by one or more of the devices 108-114 is not a core part of the input data (e.g., audio recording concurrently with textual data) of the given device and is recorded primarily to provide a means for synchronizing the data feed of that device with another data feed.

In another embodiment, in addition to audio data, one or more of the devices 108-114 acquire user-entered textual data associated with the sporting event. In this regard, the microphone of the one or more devices 108-114 may operate concurrently with the text receiving portion of the one or more devices 108-114, thereby receiving audio information associated with the sporting event at the same time the one or more devices 108-114 acquire user-entered textual data. For example, device 108 may acquire user-entered textual data (e.g., via UI of device 108) concurrently with one or more audio segments of the sporting event (e.g., via microphone of device).

For instance, device 108 may acquire statistical information (e.g., statistical player performance information) entered into device 108 (e.g., entered via keyboard, touchpad and the like) by the user during the sporting event, while the audio recorder of device 108 concurrently records audio of the sporting event. In another instance, a device 108 may acquire notational information (e.g., notes, written comments, drawings and the like) entered into device 108 by the user during the sporting event, while the audio recorder of device 108 concurrently records audio of the sporting event.

In another embodiment, one or more of the devices 108-114 may acquire video data associated with the sporting event. It is further noted herein that the microphone of the one or more devices 108-114 may operate while the one or more devices 108-114 acquire video data. For example, device 110 may acquire video of the sporting event. In one instance, the video data acquired by device 110 is accompanied by an audio track. In another instance, the video data acquired by device 110 is captured without a dedicated audio track, with instead an audio recorder function of the device 110 operating concurrently with the video camera of the device 110.

The devices 108-114 of the present invention may include any electronic devices known in the art capable of acquiring user-entered textual data, video data and/or audio data. In one embodiment, one or more of the devices 108-114 may include a mobile computing device suitable for acquiring at least one of user-entered textual data, video data and/or audio data. For example, the one or more devices 108-114 may include a mobile computing device enabled to capture at least one of user-entered textual data (e.g., entered via user interface), video data and audio data. For example, the one or more of the devices 108-114 may include, but are not limited to, a cellphone, a smartphone, a tablet and a laptop. In another embodiment, one or more of the devices 108-114 may include a desktop computer enabled to capture at least one of user-entered textual data, video data and/or audio data. In another embodiment, one or more of the devices 108-114 may include a video recording device, such as but not limited to, a video camera or a video-enabled mobile computing device. In another embodiment, one or more of the devices 108-114 may include an audio recording device, such as but not limited to, an audio recorder or an audio-enabled mobile computing device.

By way of example, a user may enter statistical or notational information related to the sporting event into a first device 108, while the first device 108 concurrently records audio data of the sporting event. Further, a second device 110 may acquire video data of the sporting event, while the second device 110 also concurrently records audio data of the sporting event. In this regard, following synchronization carried out by the various aspects of this invention, described further herein, the synchronized output feed 115 matches the user-entered statistical or notational information from the first device 108 to the video data obtained with the second device 110 at the event-time the statistical or notational data was entered into the first device 108. In one instance, the first device 108 may include a mobile phone (e.g., smartphone), tablet or laptop, while the second device 110 includes a video camera or a video-enabled mobile phone, table or laptop.

By way of another example, a first device 108, may acquire video data of the sporting event, while the first device 108 also concurrently records audio data of the sporting event via the microphone of the first device 108. Further, a second device 110, may acquire video data of the sporting event, while the second device 110 also concurrently records audio data of the sporting event. In this regard, following synchronization carried out by the various aspects of this invention, the synchronized output feed 115 matches the first video feed from the first device 108 to the second video feed obtained with the second device 110 such that the camera angles from each camera may be matched and view simultaneously. In one instance, the first device 108 may include a video camera or video-enabled mobile phone, tablet or laptop, while the second device 110 includes a video camera or a video-enabled mobile phone, table or laptop.

By way of another example, a first device 108 may acquire audio-only data of the sporting event (e.g., commentator's audio recording of event). Further, a second device 110, may acquire video data of the sporting event, while the second device 110 also concurrently records audio data of the sporting event. In this regard, following synchronization carried out by the various aspects of this invention, the synchronized output feed 115 matches the first audio-only feed from the first device 108 directly to the second video feed obtained with the second device 110. In one instance, the first device 108 may include an audio recorder, mobile phone, tablet or laptop, while the second device 110 includes a video camera or a video-enabled mobile phone, table or laptop.

By way of another example, a user may enter statistical or notational information related to the sporting event into a first device 108, while the first device 108 concurrently records audio data of the sporting event. Further, a second device 110 may acquire audio-only data of the sporting event. In this regard, following synchronization carried out by the various aspects of this invention, the synchronized output feed 115 matches the user-entered statistical or notational information from the first device 108 to the audio-only data obtained with the second device 110 at the event-time the statistical or notational data was entered into the first device 108. In one instance, the first device 108 may include a mobile phone, tablet or laptop, while the second device 110 includes an audio recorder, a mobile phone, tablet or laptop.

While the previous embodiments have focused on the combination of only two types of core data types, namely two of textual data, video data and audio-only data, it is noted herein that the present invention is not limited to a combination of only two core data feeds. It is noted herein that the previously described framework may be extended to the combination of any number of data feeds. As such, any number of data feeds made up of any combination of the group of core textual data, core video data and core audio-only data may be implemented to create a synchronized data feed 115. It is further noted that in addition to core data including textual data and video data where the core data does not an audio component, a given device also records, as non-core data, an audio feed in order to effectuate the synchronizing process of the present invention.

For example, a user may enter statistical or notational information related to the sporting event into a first device 108, such as a mobile phone, tablet or laptop, while the first device 108 concurrently records audio data of the sporting event. Further, 50 additional devices (e.g., mobile phones, tablets, laptops or video cameras) may each acquire video data of the same sporting event. In this regard, following synchronization carried out by the various aspects of this invention, the synchronized output feed 115 matches the user-entered statistical or notational information from the first device 108 to the video data obtained with the 2nd through $51^{st}$ devices. In this regard, 50 camera feeds can be played in unison (or by selection) along with the accompanying statistical or notational information appearing at the relevant moment in time during the sports event.

In another embodiment, the system 100 includes an output device 116 configured to receive the synchronized output feed 115 and display the synchronized output feed. The output device 115 may include any information output device known in the art. For example, the output device may include a smartphone, a tablet, a laptop computer, a desktop computer and the like. In addition, the output device 115 may include any audio display device and/or visual display device known in the art. The visual display device may include any suitable visual display device known in the art, such as, but not limited to, a LCD, an LED display, an OLED display, a plasma display or a CRT display. In this regard, the one or more display devices may be configured to utilize text-based messages, symbols, indicia, or other identifiable visual characters, or symbols. The audio display device may include any suitable audio display device known in the art, such as one or more audio speakers. In this regard, information related to sporting event may be relayed to a user via an audible signal, such as, but not limited to, an audible announcement, a tone, a voice, or a series of tones.

Figure 1B:
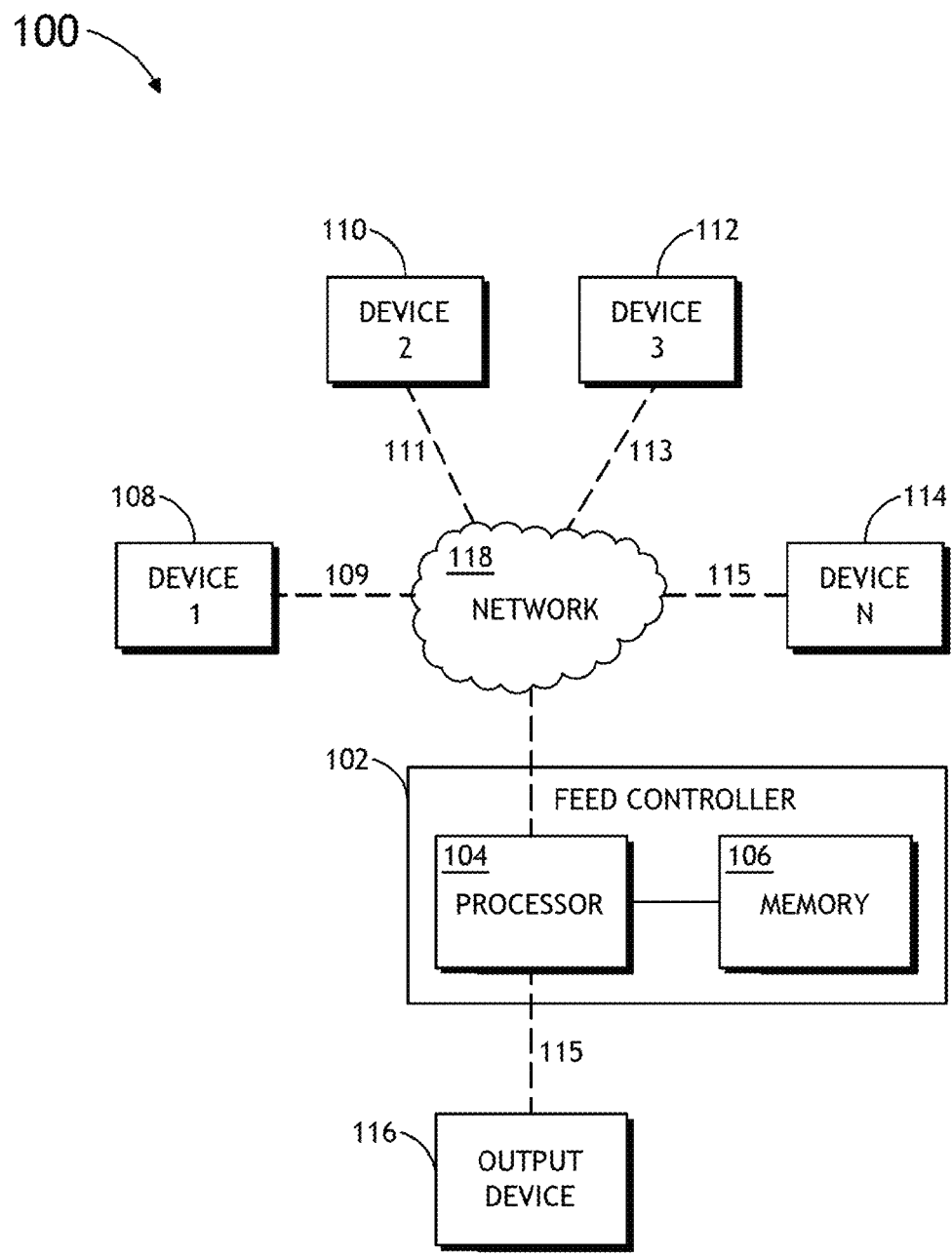
FIG. 1B illustrates a block diagram view of a system for synchronizing multiple data feeds associated with a sporting event in accordance with an embodiment of the present disclosure.
Figure 1C:
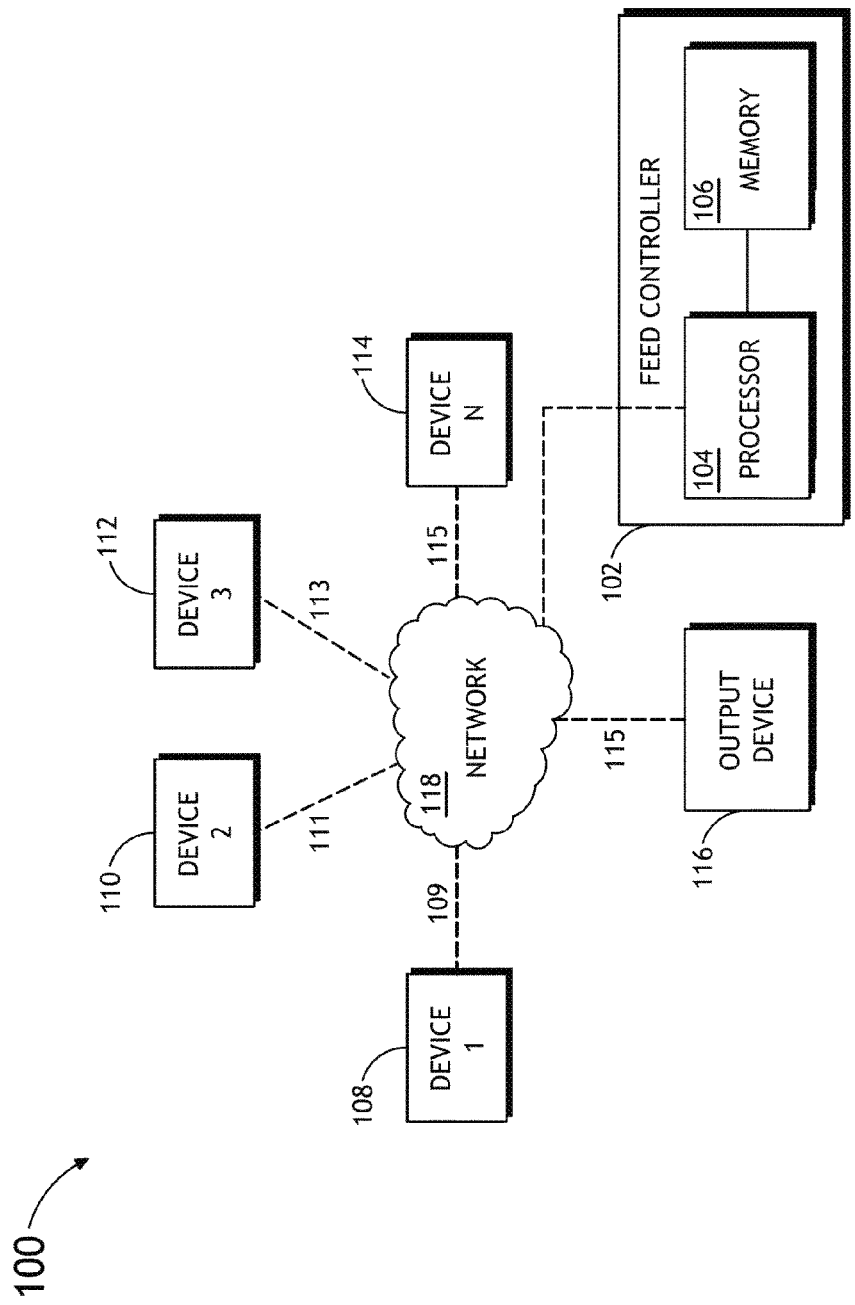
FIG. 1C illustrates a block diagram view of a system for synchronizing multiple data feeds associated with a sporting event in accordance with an embodiment of the present disclosure.

It is noted herein that the number of input devices 108-114 or the number of output devices 116 of the present invention are not limited to the examples listed in the previous description or the corresponding FIGS. 1A-1C. Rather, the recited examples are provided merely for illustrative purposes. It is noted herein that the present invention may be extended to any number of input devices and/or output devices.

It is further noted that the labeling of the various devices 108-114 is for illustrative and clarification purposes only. It is recognized that any device in a group of devices may be interpreted as the "first device" or an "additional device."

The data feeds 109-115 may be transferred from the devices 108-114 to the one or more processors 104 of the feed controller 102 in any manner known in the art. In one embodiment, the input devices 108-114 may be communicatively coupled to the one or more processors 104 via wireline (e.g., copper wire, fiber optic cable, and the like) or wireless connection (e.g., RF coupling, IR coupling, data network communication, and the like). For example, following acquisition data from the common sporting event, a user or users may place the one or more of the devices 108-114 in communication with the feed controller 102. For instance, a user or users may place one or more of the devices 108-114 in communication with the feed controller 102 via a hardline connection (e.g., USB connection, HDMI connection and the like). In another instance, a user may utilize an intermediate medium (e.g., USB drive, portable hard drive, optical disk and the like) to transfer the data feeds 109-115 from the devices 108-114 to the feed controller 102. It is further recognized that such a transfer need not occur in real time and may take place over any extended period of time. In this regard, a user or users may store one or more of the data feeds 109-115 in the memory 106 of the feed controller 102. The pertinent data may then be retrieved by the one or more processors 104 at a later time when all of the desired data feeds 109-115 have been collected by the user or various users.

In another embodiment, as shown in FIG. 1B, the one or more devices 108-114 may be placed in communication with the one or more processors 104 of the feed controller 102 via a network 118. In this regard, each of the devices 108-114 and the feed controller 102 may include a network interface device (not shown) suitable for interfacing with network 118.

It is further recognized that one or more devices 108-114 may transfer the various data feeds 109-115 to a remote storage device, which may then later be accessed by the one or more processors 104 of the feed controller 102. In one embodiment, one or more devices 108-114 may transfer the data of the various feeds 109-115 to a remote server (e.g., the "cloud") (not shown). Then, at a later time, the one or more processors 104 of the feed controller 102 may retrieve the various data feeds 109-115 in order to execute the various steps of the present invention.

Referring again to FIG. 1A, in another embodiment, the output device 116 may also be communicatively coupled to the one or more processors 104 via wireline or wireless connection. For example, following the generation of the synchronized output 115, a user or users may place the one or more of the output device 116 in communication with the feed controller 102. For instance, a user or users may place the output device 116 in communication with the feed controller 102 via a hardline connection (e.g., USB connection, HDMI connection and the like). In another instance, a user may utilize an intermediate medium (e.g., USB drive, portable hard drive, optical disk and the like) to transfer the synchronized output 115 from the feed controller 102 to the output device 116.

In another embodiment, as shown in FIG. 1C, the one or more processors 104 of the feed controller 102 are placed in communication with the output device 116 via network 118. In this regard, the output device 116 (e.g., smartphone, tablet, laptop computer, desktop computer and the like) may also include a network interface device (not shown) suitable for interfacing with network 118.

It is further recognized that, upon execution of the various steps of the present invention, the one or more processors 104 of the feed controller 102 may transfer the synchronized output feed 115 to a remote storage device, which may then later be accessed by the output device 116. In one embodiment, one or more processors 104 may transfer the synchronized output data 115 to a remote server. Then, at a later time, the output device 116 may retrieve the synchronized output feed 115 and display the output feed, in video, pictorial and/or audio form to a user.

The network interface devices described herein may include any network interface device known in the art. For instance, the network interface devices may include wireline-based interface devices (e.g., DSL-based interconnection, Cable-based interconnection, T9-based interconnection, and the like). In another instance, the network interface devices may include a wireless-based interface device employing GSM, GPRS, CDMA, EV-DO, EDGE, WiMAX, LTE, Wi-fi protocols, and the like.

Referring again to FIG. 1A, the one or more processors 104 of the feed controller 102 are configured to identify one or more distinctive audio events in each of the one or more audio segments received from the first device and the one or more audio segments received from the at least one additional device. In this regard, an identification process may act to isolate and process the audio data acquired by the first device and the one or more additional devices in order to identify the one or more distinctive audio moments in each of the acquired audio feeds. In one embodiment, the one or more processors 104 may identify a distinctive audio event in an audio segment of a first data feed 109 from a first device 108. In another embodiment, the one or more processors 104 may identify a corresponding distinctive audio event in an audio segment of an additional data feed (e.g., feed 111, feed 113, feed 115 and so on) from an additional device (e.g., device 110, device 112, device 114 and so on). It is noted herein that a single audio event, or "noise," at a common sporting event may produce a distinctive audio event in the audio data acquired by two or more of the devices 108-114. The identification of this distinctive audio event in the various audio feeds acquired with devices 108-114 serves as a time marker, allowing for the time-synchronization of the various data feeds.

Figure 2A:
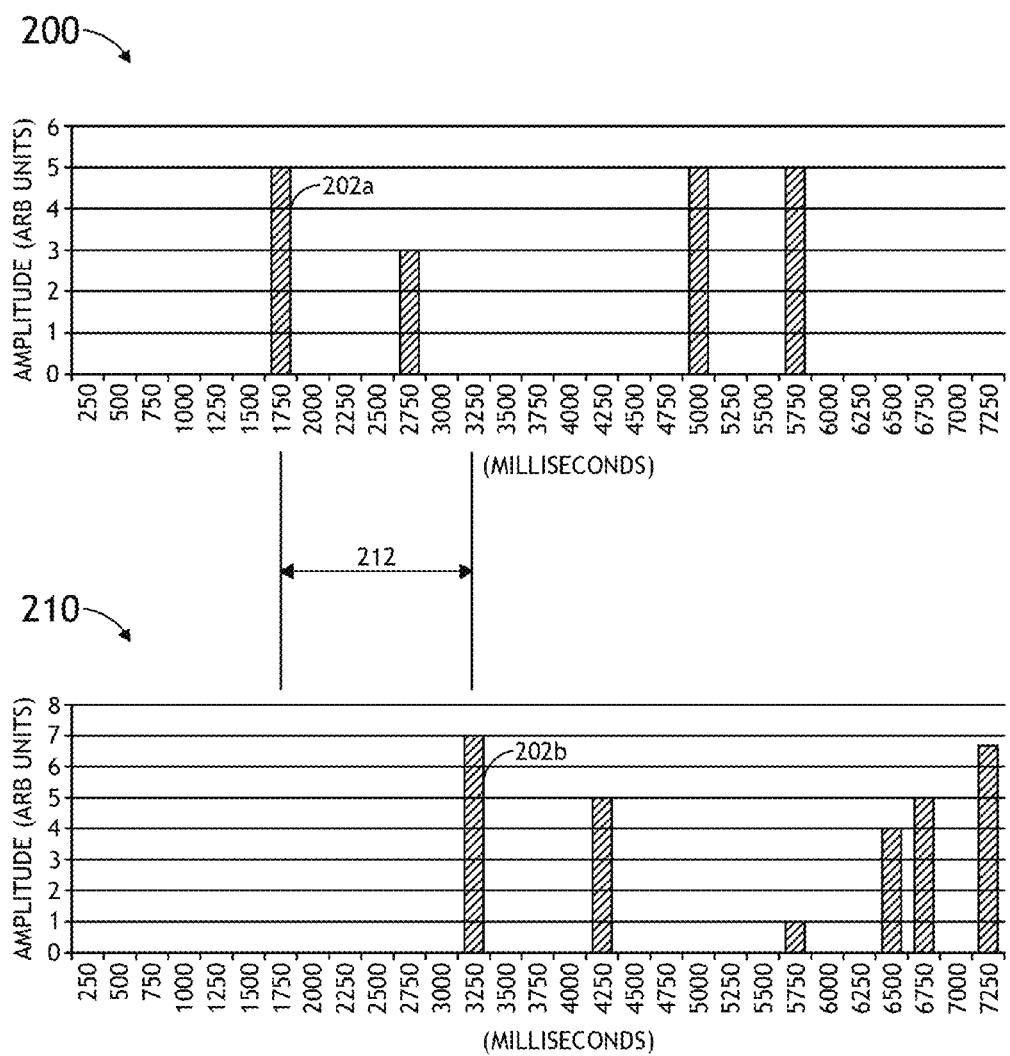
FIG. 2A illustrates a conceptual view of distinctive audio events present in two feeds.
Figure 2B:
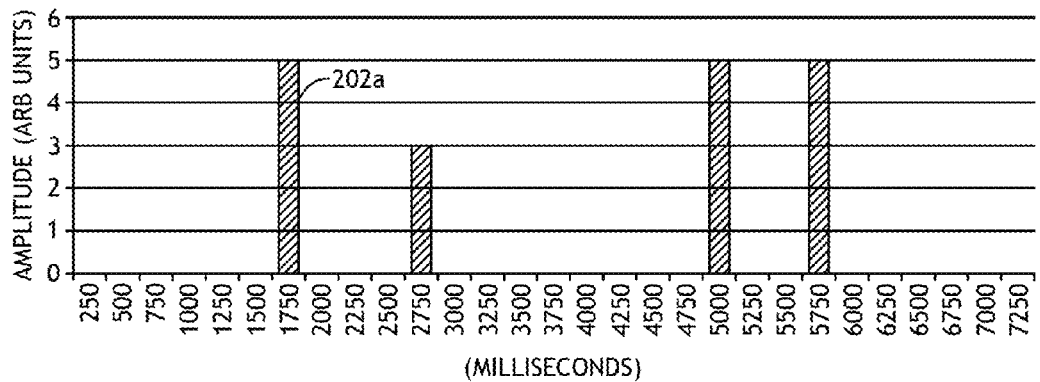
FIG. 2B illustrates a conceptual view of distinctive audio events present in two feeds following application of a time-offset.
Figure 2B:
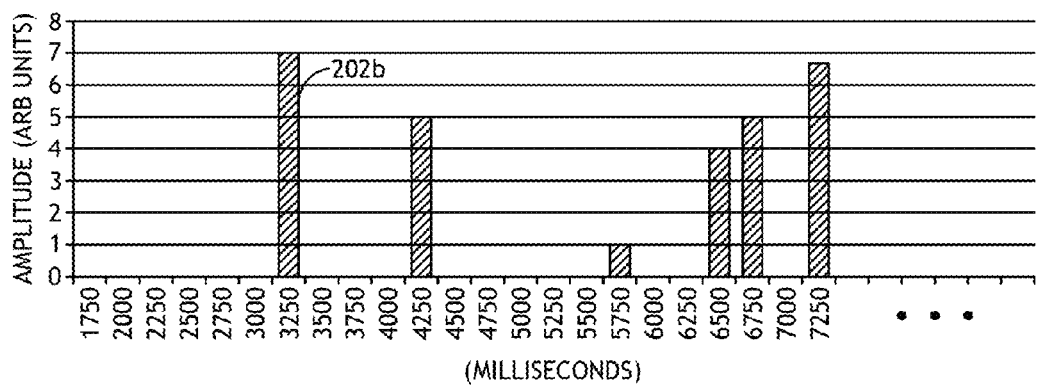

FIGS. 2A-2B illustrate a conceptual view of the present of a distinctive audio event in a first feed 200 associated with a first device 108 and a second feed 210 associated with a second device 110, in accordance with one embodiment of the present invention. A given audio feed, which may accompany a textual feed or video feed recorded concurrently by a single device, may include various audio events, as depicted conceptually as single pulses in feeds 200 and 210 of FIGS. 2A and 2B respectively. In another embodiment, the one or more processors 104 of the feed controller 102 may identify a distinctive audio event 202*a* and 202*b* that appears in both the first data feed 200 and the additional data feed 210. In turn, the identification of this common distinctive audio event 202a/202b allows the system 100 to synchronize the feeds 200 and 210, as discussed further herein.

In one embodiment, the identification of the one or more distinctive audio events in the one or more audio segments acquired from the first device and one or more additional devices includes application of a Fast Fourier Transform (FFT). In one embodiment, a FFT is applied to the one or more audio segments received from the first device 108 in order to separate the audio recording from the first device 108 into frequency buckets. Further, a FFT is applied to the one or more audio segments received from the one or more additional devices, such as devices 110, 112 or 114, in order to separate the one or more audio segments received from the one or more additional devices into frequency buckets.

In another embodiment, the one or more processors 104 of the feed controller 102 filter the frequencies within the one or more audio segments received from the first device 108 and the one or more audio segments received from the one or more additional devices 110, 112 or 114 to a set of targeted frequencies. It is noted herein that the targeted frequencies provide a distinctive audio signature associated with a given audio event. In this regard, the program instructions executed by the one or more processors 104 of the feed controller 102 filter all frequencies contained in the audio feeds associated with devices 108-114 down to a sub-set of targeted frequencies. These targeted frequencies provide a unique signature, which facilitates accurate and efficient feed matching.

In another embodiment, the one or more processors 104 of the feed controller 102 generate one or more time buckets by summing the amplitudes of the audio signal at each of the set of targeted frequencies across one or more selected time frames (e.g., 250 milliseconds) for the one or more audio segments received from the first device and the one or more audio segments received from the at least one additional device. In this regard, the amplitude of all the targeted frequencies being analyzed in a specific time frame, such as a 250 millisecond time span, may be summed to form a time bucket (e.g., see 250 millisecond time buckets in FIG. 2A-2B). It is noted herein that the utilization of time buckets, as shown in FIGS. 2A-2B, allows the system 100 to account for a signal amplitude sustained over a selected time, as opposed to a signal amplitude at a specific sampling point. In this regard, short spikes in amplitude may be filtered out, allowing the system to identify distinctive audio events based on audio events sustained over a selected time period. It is recognized herein that this ability may serve particularly advantageous in the context of sporting events. The utilization of adequately sized time buckets allows the system 100 to filter out short noise spikes that occur routinely at sporting events. For example, at a basketball event, the one or more processors 104 may implement a time bucket large enough to filter out the short spikes in audio signal associated with the squeaking of shoes on the basketball court. In this instance, the squeaking of shoes has a frequency that is similar to the frequency (e.g., 3.5 to 4.5 kHz) of a commonly used referee whistle (e.g., Fox 40 whistle). As such, filtering the signal based purely on frequency may prove insufficient. The implementation of time buckets allows the system 100 to filter out short duration signals of similar frequency and further provides for easier identification longer duration audio events, which are generally superior events for the purpose of feed correlation and synchronization.

In another embodiment, a running average of background noise for the one or more audio segments received from the first device 108 and the one or more audio segments received from the one or more additional devices 110, 112 or 114 is maintained. Further, the system 100 may identify only audio events in the received feeds as distinctive if they exceed a specified moving average threshold. For example, the system 100 may implement a "10 times background noise" threshold. It is noted herein that the background noise threshold is not limited to 10 times the background noise. This figure should not be interpreted as a limitation and is provided merely for illustrative purposes. In another embodiment, a moving average may be implemented to identify audio events across a smaller time span (e.g., one or more selected time frames of the entire time span) for a unique set of frequencies (e.g., frequencies corresponding to a referee whistle, a buzzer, a horn, crowd noise and the like).

In another embodiment, the identified distinctive audio events from the one or more audio segments from the first device may be compiled into a first distinctive audio event list, while the identified distinctive audio events list from the one or more audio segments from one or more additional devices 110, 112 or 114 may be compiled into one or more additional distinctive audio event lists. The various distinctive audio event lists may then be compared and/or correlated by the one or more processors 104 of the feed controller 102 in order to identify a timing offset between any two or more of the data feeds, as described further herein.

In another embodiment, the one or more processors 104 of the feed controller 102 determine a timing offset between the first data feed and the at least an additional data feed. In one embodiment, the one or more processors 104 may determine the timing offset by comparing the one or more distinctive audio events of the one or more audio segments received from the first device 108 to the one or more distinctive audio events of the one or more audio segments received from the one or more additional device 110, 112 or 114.

FIG. 2A illustrates a timing offset identified between the first feed 200 and an additional feed 210. The timing offset required to establish an absolute time for the feeds 200 and 210 can be measured by measuring the offset 212 between one or more common distinctive audio events 202a/202b. In turn, this timing offset 212 may be applied to shift the one or more data feeds, including the textual and/or video data accompanying the audio data, by an amount equivalent to the timing offset, as shown in FIG. 2B, thereby establishing a synchronized data feed with all data feed types (e.g., audio data, textual data, and video data) synchronized to a common time line, or absolute time.

In one embodiment, the one or more processors 104 execute a distinct event correlation procedure to compare the identified one or more distinctive audio events of the one or more audio segments received from the first device 108 (e.g., compiled in the distinctive audio event list for the first device) to the one or more distinctive audio events of the one or more audio segments received from the one or more additional devices 110, 112 or 114 (e.g., compiled in the distinctive audio event list for the first device).

Figure 3:
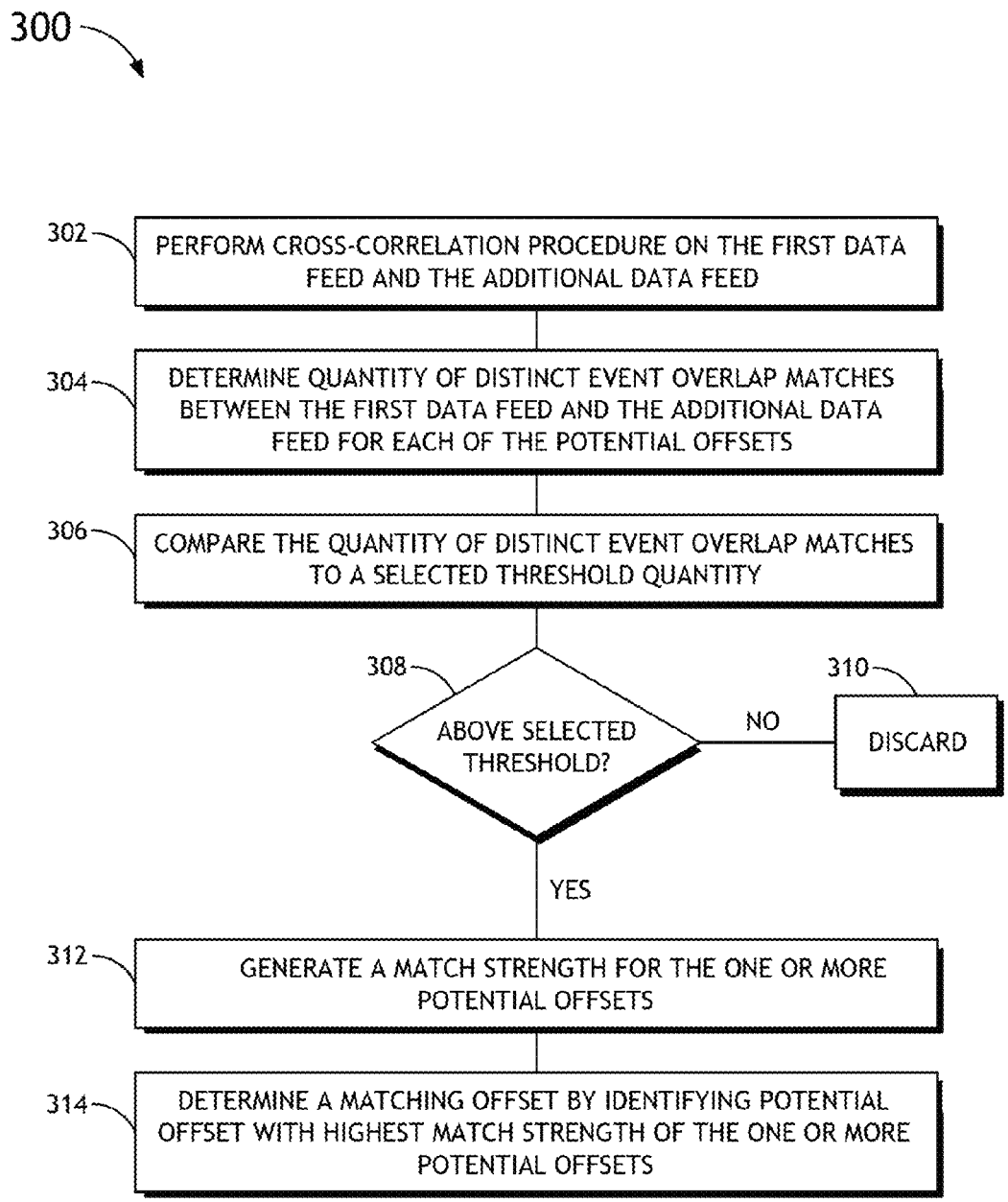
FIG. 3 illustrates a process flow 300 for a distinct event correlation procedure in accordance with an embodiment of the present disclosure.

FIG. 3 illustrates a process flow diagram 300 depicting the steps of a distinct event correlation procedure, in accordance with one embodiment of the present invention. In step 302, the one or more processors 104 may perform a cross-correlation procedure on the first data feed 109 and one or more additional data feeds 111, 113 or 115. The cross-correlation procedure may include generating a set of correlation results indicative of a degree of overlapping distinct audio events between the first data feed 109 and one or more additional data feed 111, 113 or 115 for each of a plurality of potential offsets, or proposed offsets. In this regard, the cross-correlation process is performed by the one or more processors 104 on multiple feeds, which produces an array of correlation results, which indicate the degree of overlapping distinctive audio events across all the feeds for each potential offset.

In step 304, the one or more processors 102 may determine a quantity of distinct event overlap matches between the first data feed 109 and the one or more additional data feeds 111, 113 or 115 for each of the plurality of potential offsets. In one embodiment, a number of matches between the first data feed 109 and the one or more additional data feeds 111, 113 or 115 is recorded for each potential offset. In one embodiment, a "match" is defined by as any overlapping time buckets of the first data feed 109 or any of the one or more additional feeds 111, 113 or 115 that both contain a distinctive audio signal.

In step 306, the one or more processors 104 may compare the determined quantity of distinct event overlap matches between the first data feed 109 and the one or more additional data feeds 111, 113 or 115 for each of the plurality of potential offsets to a selected threshold quantity. In step 308, the one or more processors 104 determine whether the quantity of distinct event overlap matches is above or below the selected threshold quantity for one or more potential offsets. In the event a given potential offset has a quantity of distinct event overlap matches below the selected threshold quantity, the one or more processors 104 may eliminate, or discard, the given potential offset in step 310. In the event a given potential offset has a quantity of distinct event overlap matches at or above the selected threshold quantity, the process flow moves to step 312. It is noted herein that the elimination of potential offsets with inadequate matches serves to reduce the noise generated by increasing the emphasis on the number overlapping distinct audio moments, as opposed to amplitude of overlapping distinct audio moments. Applicants note that, in the case of basketball games, reliable results have been achieved using a minimum "hit" (i.e., overlap matches) requirement of two. Applicants further note that this is not limiting and should be interpreted merely as an illustration. It is anticipated that any number of hits (e.g., 1, 2, 3, 4, 5 and so on) may be utilized as the selected threshold quantity.

In step 312, in response to a determination of a quantity of distinct event overlap matches at or above the selected threshold quantity for one or more potential offsets, the one or more processors 104 may generate a match strength for each of the potential offsets. In one embodiment, a match strength for one or more potential offsets may be generated by multiplying a cross-correlation result for the one or more potential offsets by a selected scaling factor. For example, a final match strength for a given potential offset may be computed by multiplying the cross-correlation result of the given potential offset by 10 to the power of the M, where M represents the number of hits for the given offset. It is noted that the implementation of such a scaling factor may further emphasize the number of overlap matches relative to the amplitude of the event overlaps. It is noted herein that the above scaling factor is not limiting and should only be interpreted as illustrative. It is recognized herein that additional scaling factors may be invoked in order to better balance the number of audio event overlaps with the amplitude of the event overlaps.

In step 314, the one or more processors 104 may determine a matching offset by identifying the potential offset of the plurality of potential offsets with the highest match strength. It is recognized herein that the potential offset with the highest final match strength is the offset most likely to accurately match the two or more received data feeds.

It is recognized that various sets of program instructions may be implemented to cause the one or more processors 104 to execute the process flow 300. One such set of program instructions includes the following:

```
protected static double[ ] CustomCrossCorrelation
  (List<double> f, List<double> g)
{
  var fSize=f.Count;
  var gSize=g.Count;
  var reversedG=g.ToList( );
  reversedG.Reverse( );
  var result=new double[fSize+gSize-1];
  for (int n=0; n<result.Length; n++)
  {
    result[n]=0;
    int kmin=(n>=gSize-1)?n-(gSize-1): 0;
    int kmax=(n<fSize-1)?n: fSize-1;
    int nonZero=0;
    for (int k=kmin; k<=kmax; k++)
    {
      var curVal=f[k]*reversedG[n-k];
      result[n]+=curVal;
      nonZero+=curVal>0?1:0;
    }
    if (nonZero<2) result[n]=0;
    else result[n] *=Math.Pow(10, nonZero);
  }
  return result;
}
```

It is noted herein that the present invention is not in any way limited to the program instructions provided above, which have been provided merely for illustrative purposes.

In another embodiment, the one or more processors of the feed controller 102 are configured to generate a synchronized output feed 115 by establishing a common absolute time for the first data feed and the at least one additional data feed based on the determined timing offset. For example, as shown in FIG. 2B, the offset 212 may be utilized to establish an absolute time between two or more feeds received from the devices 108, 110, 112 or 114, thereby allowing the two or more feeds to be synchronized (e.g., by time-shifting one or more of the feeds relative to one or more other feeds).

In another embodiment, the one or more processors 104 of the feed controller 102 may generate a level of offset accuracy. In a general sense, after an offset match has been found between two or more feeds (e.g., first feed 109, second feed 111, third feed 113 or fourth feed 115), additional evaluations may be carried out to assess the likelihood that the determined offset match is accurate, as described further herein.

In one embodiment, the one or more processors 104 of the feed controller 102 may determine a level of offset accuracy by comparing a ratio of the cross-correlation result of the determined matching offset and the cross-correlation result of a potential offset having the second highest match strength (or the third, fourth and so on) of the one or more potential offsets.

For example, the ratio between the cross-correlation result of the matching offset and the offset with the second highest match strength may be calculated by dividing the cross-correlation result of the offset with the maximum final match strength (i.e., the offset chosen as the most likely to provide a match) by the correlation result of the offset with the next highest final match strength (i.e., the second-best match). In the event the resulting value is less than a selected threshold for the audio event being matched, the match may be deemed unreliable. It is noted herein that the implemented threshold may be a function of the type of the audio event and the length of the given feed. Applicants further note that this ratio is not limiting and is provided merely for illustrative purposes.

It is recognized herein that the match ratio calculation takes into account the fact that the correct match should typically be significantly stronger than the next-best match if it is truly accurate and the second best is truly inaccurate. Applicants note that in the case of basketball games, where a video and a statistical feed are being matched, successful results have been generated using a threshold ratio of 10,000.

It is further noted herein that when evaluating comparable match offsets, due to the fact that distinct audio events may last longer than a single time bucket. For example, a whistle in a basketball game can last longer than 250 millisecond and, therefore, trails across multiple time buckets when using a generally useful time bucket size of 250 milliseconds for basketball. In another embodiment, the match strength evaluation process of the present invention may exclude potential match offsets within two time buckets on either side of the peak match.

In another embodiment, the one or more processors 104 of the feed controller 102 may determine a level of offset accuracy by identifying one or more illogical event scenarios. For example, the one or more processors 104 of the feed controller 102 may identify scenarios where the matching process described previously herein returns data segments in an illogical order, given the nature of the event from which the feed was recorded. For instance, in the case where one of the data feeds is a statistical feed from a basketball game, the likelihood of high match accuracy is lower if the statistics from the third quarter of play are placed in advance of statistics from the second quarter of play as a result of the offset found by the system 100. By way of another example, the one or more processors 104 may identify scenarios where two or more specific statistical events, after undergoing the offset process, appear to occur simultaneously in time in an illogical way (e.g., made field goal and a turnover for the same player are placed at the exact same time).

In another embodiment, the one or more processors 104 of the feed controller 102 may determine a level of offset accuracy by identifying one or more textually recorded game events outside a time period corresponding to one or more video or audio recorded game segments. For example, the one or more processors 104 of the feed controller 102 may identify scenarios where textually recorded game events fail to overlap in time with the one or more video or audio recorded game segments. For instance, in the case where game events from a data feed from a first device 108, such as a data feed from a mobile statistics application (e.g. shots, rebounds, and turnovers in a basketball game), are located sufficiently outside a time frame or time frames corresponding to the video segments of the same game acquired with a second device 110, a lower likelihood of offset match accuracy may exist. It is noted that in many cases statistical data is entered by a user (e.g., videographer) during "dead times," corresponding to gaps in live play, such as, but not limited to, timeouts, end of periods, injuries or downtime before and/or after free throws (in the case of basketball). As such, historical trends for a given device and/or user may be used to develop a threshold for the number of events expected to not overlap with video or audio from other feeds.

In one embodiment, at least one of the first data feed and the one or more additional data feeds includes two or more non-continuous audio segments. For the purposes of the present disclosure, this scenario is referred to herein as a "segmented feed."

It is noted herein that, in the event a feed is segmented into multiple, non-continuous segments with some segments lacking the necessary number of distinctive audio events to reliably correlate the given feed with another feed, an "anchor" segment may be implement to determine the overall offset for the given feed. A common example includes a video recording of a game in which the camera operator stopped recording for a period of time (e.g., timeouts, injuries, end-of-period and other other dead-time) and restarted recording at a later time and repeating that process multiple times for a given sporting event. This results in multiple video files ("segments") for a single game.

In one embodiment, the one or more processors 104 of the feed controller 102 may identify at least one of the first data feed 109 and the one or more additional data feeds 111, 113, or 115 as including two or more non-continuous audio segments. In another embodiment, the one or more processors 104 may identify one or more anchor segments within at least one of the first data feed and the one or more additional data feeds. For the purposes of the present disclosure an "anchor" segment corresponds to the segment of a given feed having the strongest correlation with another feed.

In another embodiment, the one or more processors 104 may determine the timing offset for at least one of the first data feed and the one or more additional data feeds utilizing an anchor segment contained within at least one of the first data feed and the at least one additional data feed.

It is recognized herein that the process for determining strength of match between multiple data feeds analyzes both the number of matching events and the amplitude of matching moments. In another embodiment, the number of matching events may be weighted higher than the amplitude of the matching events (e.g. 3 matching moments take precedence over two matching moments, regardless of amplitude).

In another embodiment, the one or more processors 104 may apply the determined timing offset to all segments of at least one of the first data feed and the least one additional data feed. In this regard, the timing offset found using the anchor segment is applied to each segment that cannot be reliably matched via audio analysis, allowing the present invention to match the entire feed even if many segments lack distinctive audio events.

As the additional segments are arranged using the general offset, the corresponding media times, in the event the segments include metadata indicating the time of recording, which is often added automatically by the recording device, may be analyzed to verify the position determined by the segmented audio analysis and the position determined by their media times is consistent.

In one embodiment, at least one of the first data feed from the first device and one or more additional data feeds from one or more additional devices may include a continuous whole-event audio segment. In settings where one or more of the received feeds includes a whole-event feed, the one or more processors 104 of the feed controller 102 may apply a whole-event feed preparation procedure.

In one embodiment, prior to identifying one or more distinctive audio events in the one or more audio segments received from the first device and the one or more audio segments received from the one or more additional devices, the one or more processors 104 may determine whether the one or more audio segments received from the first device 108 and the one or more audio segments received from the one or more additional devices 110, 112, or 114 have accurate media time metadata within a selected threshold.

In one embodiment, media time metadata accuracy may be evaluated by analyzing the recording date of the first feed and the one or more additional feeds in conjunction with the length of time a given segment fails to intersect with any other segment.

In another embodiment, the one or more processors 104 may determine whether all of the segments of the first feed and the one or more additional feeds fall within a selected time span threshold based on the expected time span of the sporting event. For example, for a basketball game, a time threshold of 6 hours may be set. In this case, all segments should have media times within a 6 hour window at a maximum.

In another embodiment, a small threshold (e.g., 1-2 seconds) may be utilized to account for lack of granularity in the media times recorded by some devices. For instance, many cameras only record media times the level of one second.

In one embodiment, prior to identifying one or more distinctive audio events in the one or more audio segments received from the first device and the one or more audio segments received from the one or more additional devices, the one or more processors may determine whether the one or more audio segments received from the first device and the one or more audio segments received from the one or more additional devices have accurate media time metadata within a selected threshold.

In another embodiment, if the media time metadata does not exist or is deemed inaccurate, the whole-event preparation procedure described further herein is not applied by the one or more processors.

In another embodiment, upon determination that the one or more audio segments received from the first device and the one or more audio segments received from the one or more additional devices have accurate media time metadata within the selected threshold, the one or more processors 104 of the feed controller 102 concatenate two or more audio segments (e.g., concatenate all of the audio segments) received from the first device. Further, the one or more processors 104 concatenate two or more audio segments (e.g., concatenate all of the audio segments) received from the one or more additional devices. In this regard, all segments for a given feed with accurate media time metadata are may be concatenated based on the media time metadata (recording date and time) of the given feed.

In another embodiment, the one or more processors 104 of the feed controller 102 may insert time gaps between two or more audio segments received from the at least first device in order to account for time periods corresponding to no audio recording. In another embodiment, the one or more processors 104 of the feed controller 102 may also insert time gaps between two or more audio segments received from the one or more additional devices in order to account for time periods corresponding to no audio recording. In this regard, gaps are inserted into the first feed and/or the one or more additional feeds in order to account for downtime between the recorded segments in settings where the device was not actively recording. It is noted herein that this process may be repeated for each feed that has accurate media time metadata.

Following the application of the whole-event preparation procedure, the one or more processors 104 may then identify the distinctive audio events across a given feed for the entire event, in a manner similar that the distinctive audio event identification described previously herein. In a further embodiment, a given whole-event feed is then matched with other feeds from the event using the same correlation approach as described for a segmented feed. However, in the whole-event segment scenario, the feeds include only a "segment" that spans the sporting event. The existence of a single segment spanning the entire event increases matching accuracy by increasing the number of distinct audio moments that can be correlated.

In another embodiment, the one or more processors 104 of the feed controller 102 may store a determined timing offset between the first data feed 109 and one or more additional data feeds 111, 113 or 115 in a memory. In another embodiment, the one or more processors 104 of the feed controller 102 may store a device identifier in memory. For example, the one or more processors 104 may store the determined timing offset between the first data feed 109 and one or more additional data feeds 111, 113 or 115 in a memory 106 of the feed controller 102. Further, the one or more processors 104 of the feed controller 102 may store a device identifier in a memory of the feed controller 102. In another embodiment, the one or more processors 104 of the feed controller 102 may retrieve the stored timing offset and the stored device identifier from memory (e.g., memory 106). In another embodiment, the one or more processors 104 may generate an additional synchronized output feed based on the stored timing offset and the stored device identifier. In this regard, once multiple feeds have been synchronized using the distinct audio event process described throughout the present disclosure, the synchronization offset for each feed may be persisted in the system 100. In addition, a unique device identifier may also be stored along with the synchronization offset in order to allow for future correlation without the need for audio analysis.

In one embodiment, at least one of the first data feed and the one or more additional data feeds lacks any segments needed to carry out the distinct audio event analysis described throughout the present disclosure. In this scenario, the one or more processors 104 of the feed controller 102 may match two or more feeds based on media time metadata.

In one embodiment, the one or more processors 104 may receive a first data feed including at least one of user-entered textual data, video data and audio data and one or more additional data feeds including at least one of user-entered textual data, video data and audio data. In another embodiment, the one or more processors may identify matchability of the received first data feed and the one or more additional data feeds via a distinctive audio event matching procedure.

In another embodiment, upon identification of at least one of the first data feed and the one or more additional data feeds as being unmatchable via the distinctive audio event matching procedure, the one or more processors 104 may synchronize the first data feed and the one or more additional data feeds based on the media time associated with the first data feed and the media time associated with the one or more additional data feeds.

For example, in the case where no segments in a given feed match reliably via distinctive audio event analysis and accurate media time metadata is available for all feeds being matched, then the one or more processors 104 may synchronize the feeds based purely on media times. It is noted herein that this process is effective in settings where the various feeds being synchronized have media times that are already synchronized. For instance, in the case where at least one of the first device 108 and one or more additional devices 110-114 are mobile phones, the mobile phone clocks that supply the media time metadata are should be accurate within a selected threshold. For example, in the case of basketball, this accuracy threshold may be approximately 1-5 seconds.

For the purposes of the present disclosure, the term "processor" may be broadly defined to encompass any device having one or more processing or logic elements, which execute instructions from a memory medium (e.g., memory 106). In this sense, the one or more processors 104 may include any microprocessor-type device or logic elements configured to execute software algorithms and/or program instructions. In one embodiment, the one or more processors 104 may consist of a desktop computing or other computer system (e.g., mobile computing system, networked computing system and the like) configured to execute a set of program instructions configured to operate the system 100, as described throughout the present disclosure. It should be recognized that the steps described throughout the present disclosure may be carried out by a single computer system or, alternatively, multiple computer systems. Moreover, different subsystems of the system 100, such as the devices 108, 110, 112 and 114 or the output device 116, may include a processor or logic elements suitable for carrying out at least a portion of the steps described above. Therefore, the above description should not be interpreted as a limitation on the present invention but merely an illustration.

Further, the memory 106 may include any memory medium suitable for storing the program instructions suitable for execution by the communicatively coupled one or more processors 104. The memory 106 may include any memory medium known in the art such as a read-only memory, a random access memory, a magnetic or optical disk, a non-volatile memory, a solid state drive, a memory maintained in the "cloud" or a magnetic tape. Program instructions implementing methods such as those described herein may be transmitted over or stored on a carrier medium. The carrier medium may be a transmission medium such as a wire, cable, or wireless transmission link.

Figure 4:
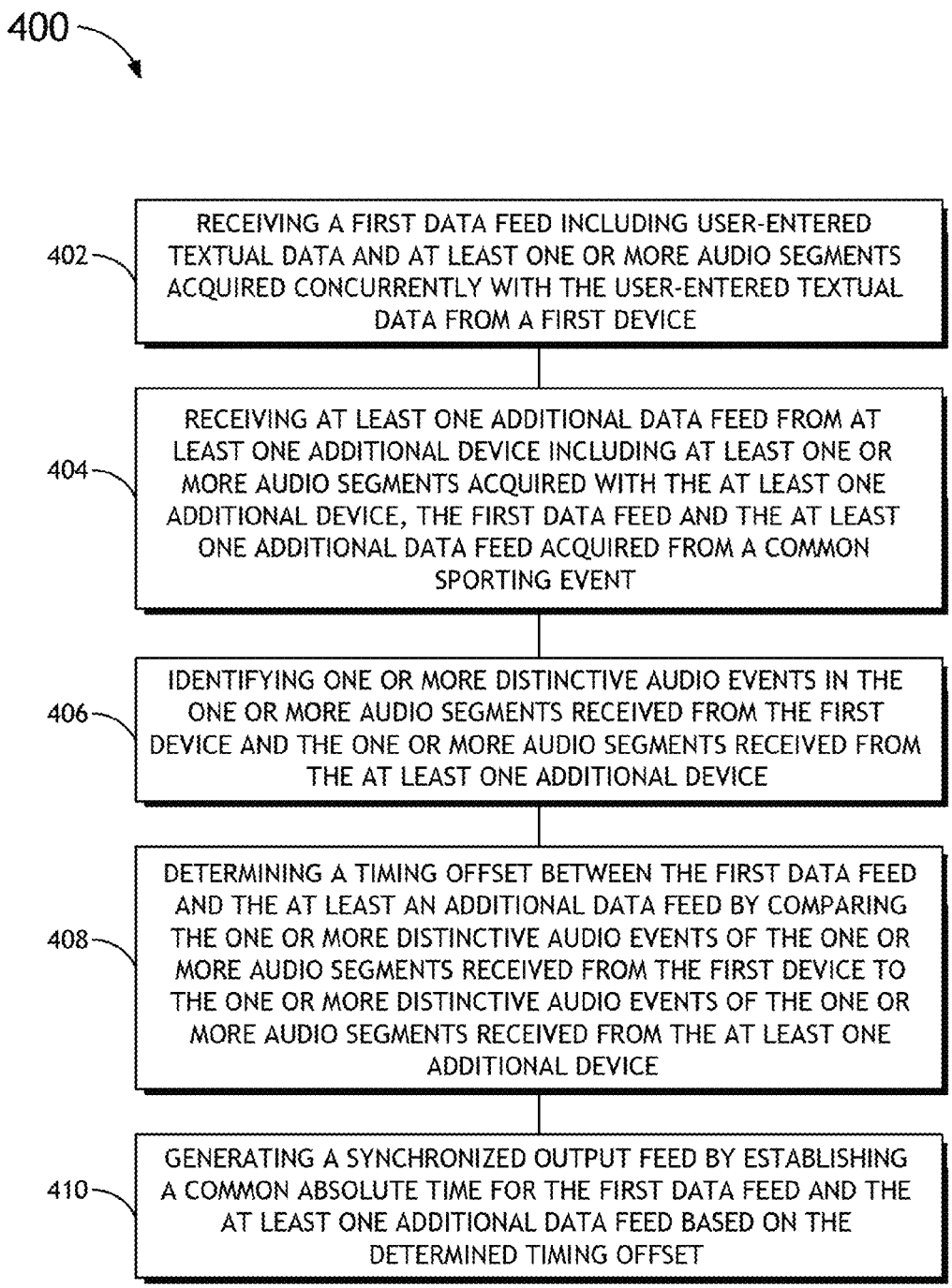
FIG. 4 illustrates a process flow 400 for synchronizing multiple data feeds associated with a sporting event in accordance with an embodiment of the present disclosure.

FIG. 4 illustrates a process flow diagram depicting the steps of a method 400 for synchronizing multiple data feeds associated with a sporting event. In step 402, a first data feed including user-entered textual data and at least one or more audio segments acquired concurrently with the user-entered textual data is received from a first device. In step 404, at least one additional data feed from at least one additional device including at least one or more audio segments acquired with the at least one additional device is received. In one embodiment, the first data feed and the at least one additional data feed are acquired from a common sporting event. In step 406, one or more distinctive audio events in the one or more audio segments received from the first device and the one or more audio segments received from the at least one additional device are identified. In step 408, a timing offset between the first data feed and the at least an additional data feed is determined by comparing the one or more distinctive audio events of the one or more audio segments received from the first device to the one or more distinctive audio events of the one or more audio segments received from the at least one additional device. In step 410, a synchronized output feed is generated by establishing a common absolute time for the first data feed and the at least one additional data feed based on the determined timing offset.

Figure 5:
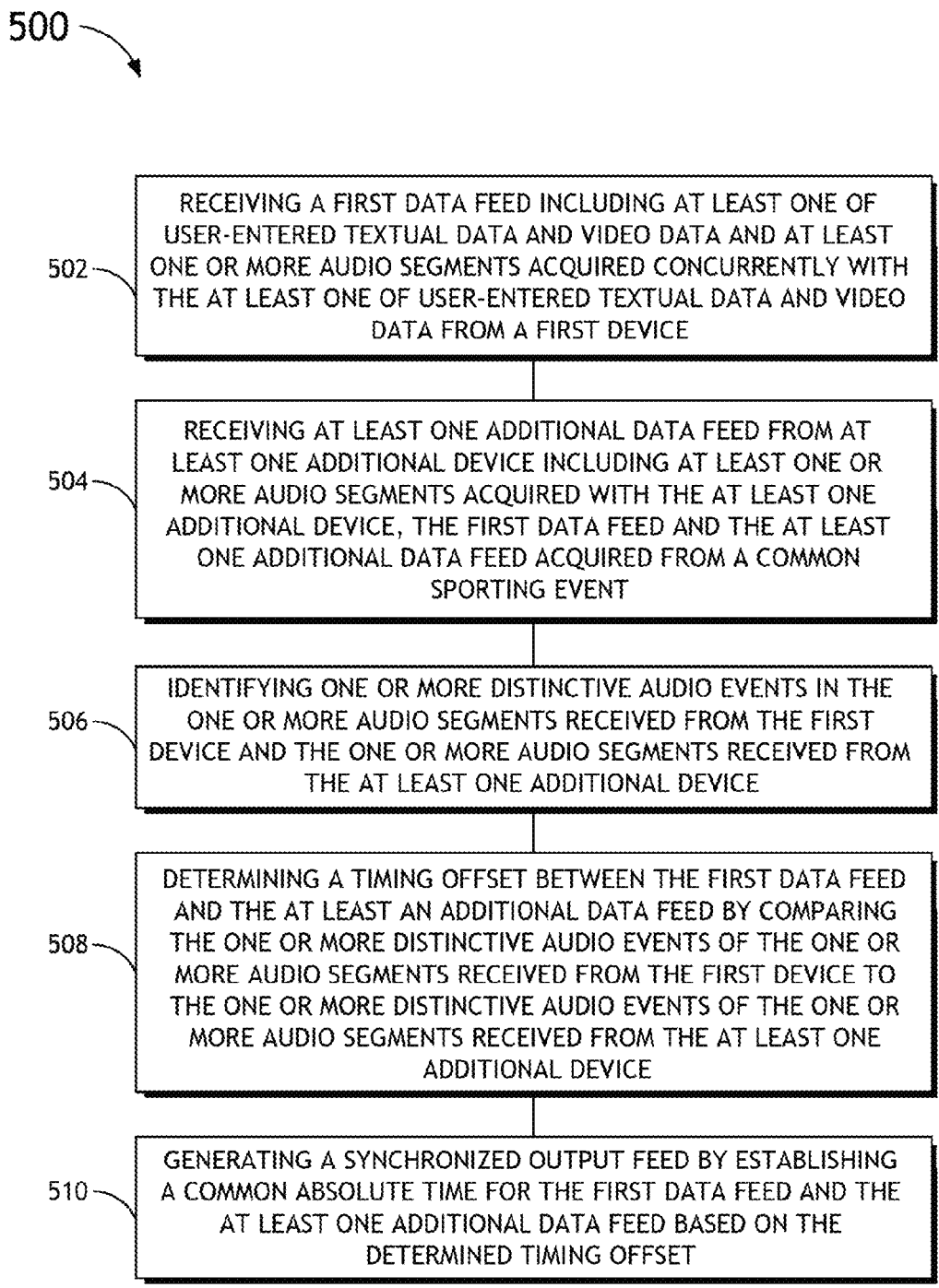
FIG. 5 illustrates a process flow 500 for synchronizing multiple data feeds associated with a sporting event in accordance with an embodiment of the present disclosure.

FIG. 5 illustrates a process flow diagram depicting the steps of a method 500 for synchronizing multiple data feeds associated with a sporting event. In step 502, a first data feed including at least one of user-entered textual data and video data and at least one or more audio segments acquired concurrently with the at least one of user-entered textual data and video data from a first device is received. In a second step 504, at least one additional data feed from at least one additional device including at least one or more audio segments acquired with the at least one additional device is received. In one embodiment, the first data feed and the at least one additional data feed are acquired from a common sporting event. In step 506, one or more distinctive audio events in the one or more audio segments received from the first device and the one or more audio segments received from the at least one additional device are identified. In step 508, a timing offset between the first data feed and the at least an additional data feed is determined by comparing the one or more distinctive audio events of the one or more audio segments received from the first device to the one or more distinctive audio events of the one or more audio segments received from the at least one additional device. In step 510, a synchronized output feed is generated by establishing a common absolute time for the first data feed and the at least one additional data feed based on the determined timing offset.

Figure 6:
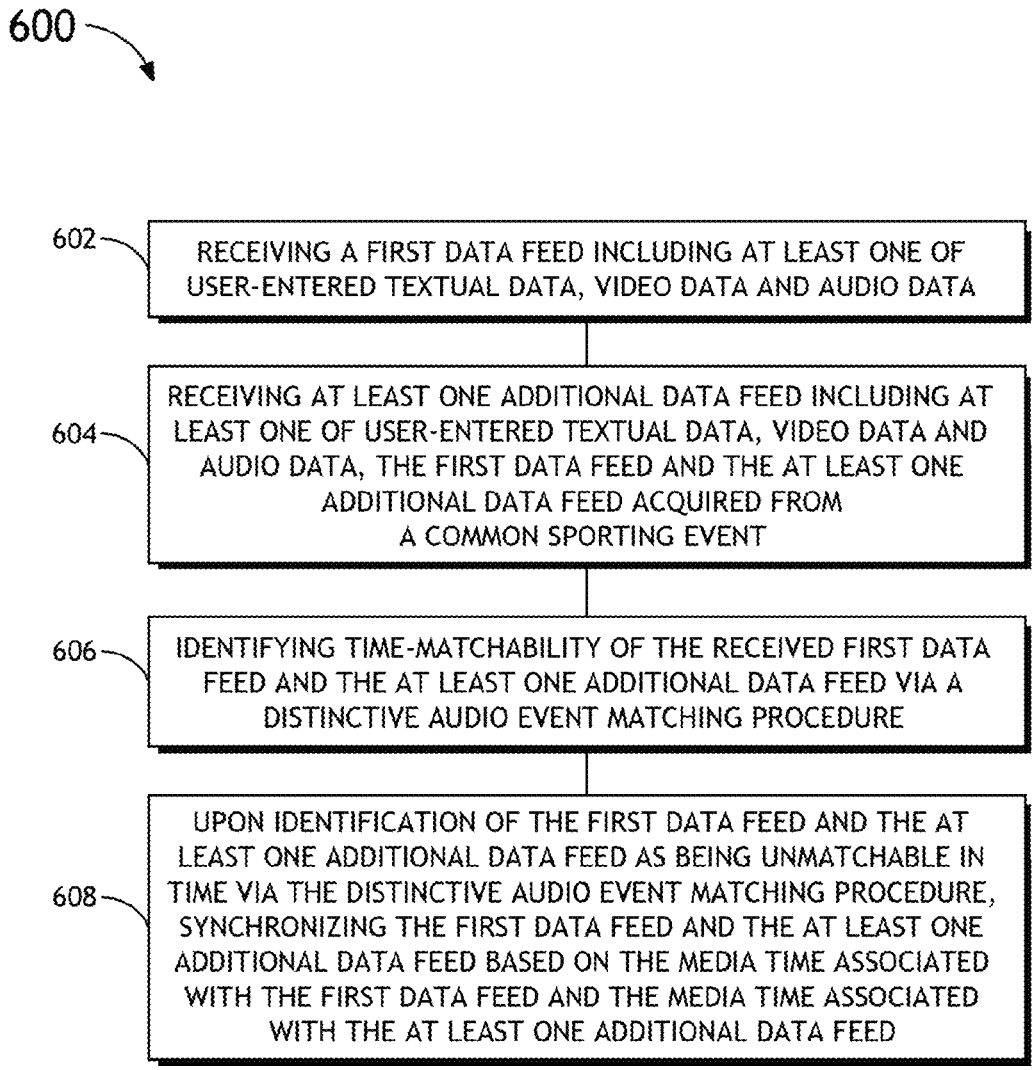
FIG. 6 illustrates a process flow 600 for synchronizing multiple data feeds associated with a sporting event in accordance with an embodiment of the present disclosure.

FIG. 6 illustrates a process flow diagram depicting the steps of a method 600 for synchronizing multiple data feeds associated with a sporting event. In step 602, a first data feed including at least one of user-entered textual data, video data and audio data is received. In step 604, at least one additional data feed including at least one of user-entered textual data, video data and audio data is received. In one embodiment, the first data feed and the at least one additional data feed acquired from a common sporting event. In step 606, the matchability of the received first data feed and the at least one additional data feed via a distinctive audio event matching procedure identified. In step 608, upon identification of at least one of the first data feed and the at least one additional data feed as being unmatchable via the distinctive audio event matching procedure, the first data feed and the at least one additional data feed are synchronized based on the media time associated with the first data feed and the media time associated with the at least one additional data feed.

While the various examples of the system and method for synchronizing multiple data feeds have focused on sporting events, it is contemplated herein that the present invention may be extended to additional contexts. For example, that the method and system for synchronizing multiple data feeds may be employed in security system applications, surveillance systems, and the like without departing from the scope and intent of the present disclosure.

In the present disclosure, the methods disclosed may be implemented as sets of instructions or software readable by a device. Further, it is understood that the specific order or hierarchy of steps in the methods disclosed are examples of exemplary approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

What is claimed:

1. A method for synchronizing multiple data feeds associated with a common sporting event comprising:
   receiving a first data feed including user-entered textual data and at least one or more audio segments acquired concurrently with the user-entered textual data from a first device;
   receiving at least one additional data feed from at least one additional device including at least one or more audio segments acquired with the at least one additional device, the first data feed and the at least one additional data feed acquired from a common sporting event;
   identifying one or more distinctive audio events in the one or more audio segments received from the first device and the one or more audio segments received from the at least one additional device, wherein the identifying one or more distinctive audio events comprises:
      applying a transform to each of the one or more audio segments received from the first device and the one or more audio segments received from the at least one additional device in order to separate each of the one or more audio segments received from the first device and the one or more audio segments received from the at least one additional device into frequency buckets; and
      generating one or more time buckets by summing the amplitudes of the audio signal at each of the set of targeted frequencies across one or more selected time frames for the one or more audio segments received from the first device and the one or more audio segments received from the at least one additional device,
   determining a timing offset between the first data feed and the at least an additional data feed by comparing the one or more distinctive audio events of the one or more audio segments received from the first device to the one or more distinctive audio events of the one or more audio segments received from the at least one additional device; and
   generating a synchronized output feed by establishing a common absolute time for the first data feed and the at least one additional data feed based on the determined timing offset.

2. The method of claim 1, wherein the generated one or more time buckets span 250 ms.

3. The method of claim 1, further comprising:
   determining a running average of background noise for the one or more audio segments received from the first device and the one or more audio segments received from the at least one additional device; and
   filtering out the generated one or more time buckets at a set of target frequencies across one or more selected time frames for the one or more audio segments received from the first device and the one or more audio segments received from the at least one additional device having a summed amplitude below a selected threshold.

4. The method of claim 3, wherein the selected threshold is ten times the running average of the background noise.

5. The method of claim 1, further comprising:
   determining a level of offset accuracy by identifying one or more illogical event scenarios.

6. The method of claim 1, further comprising:
   determining a level of offset accuracy by identifying one or more textually recorded game events outside a time period corresponding to one or more video or audio recorded game segments.

7. The method of claim 6, wherein the determining a likelihood of offset accuracy by identifying one or more textually recorded game events outside a time period corresponding to one or more video or audio recorded game segments comprises:
   determining a level of offset accuracy by identifying one or more textually recorded game events outside a time period corresponding to one or more video or audio recorded game segments within a selected threshold defined by a user trend or device trend.

8. The method of claim 1, wherein the at least one additional data feed includes at least one of a video feed, audio-only feed or user-entered textual data.

9. The method of claim 1, wherein the one or more distinctive audio events comprise:
   a sound of a whistle between 3.5 and 4.5 kHz.

10. The method of claim 1, wherein the one or more distinctive audio events comprise:
    at least one of a sound of a buzzer, a sound of a horn, a sound of a bell, a sound of a starting gun, and crowd noise.

11. The method of claim 1, wherein the one or more distinctive audio events include at least one of a golf club striking a golf ball, a baseball bat striking a baseball, an athlete impacting a surface, a gymnast hitting a springboard and a diving board hitting the fulcrum of a diving apparatus.

12. The method of claim 1, wherein at least one of the first data feed and the at least one additional data feed includes a single continuous audio segment or a continuous whole-event audio segment.

13. The method of claim 12, further comprising:
    applying a whole-event feed preparation procedure to at least one of the first data feed and the at least one additional data feed.

14. The method of claim 1, wherein at least one of the first data feed and the at least one additional data feed includes two or more non-continuous audio segments.

15. The method of claim 14, further comprising:
    identifying at least one of the first data feed and the at least one additional data feed as including two or more non-continuous audio segments;
    identifying one or more anchor segments within at least one of the first data feed and the at least one additional data feed;
    determining the timing offset for at least one of the first data feed and the at least one additional data feed utilizing an anchor segment contained within at least one of the first data feed and the at least one additional data feed; and
    applying the determined timing offset to all segments of at least one of the first data feed and the least one additional data feed.

16. A method for synchronizing multiple data feeds associated with a common sporting event comprising:

receiving a first data feed including user-entered textual data and at least one or more audio segments acquired concurrently with the user-entered textual data from a first device;

receiving at least one additional data feed from at least one additional device including at least one or more audio segments acquired with the at least one additional device, the first data feed and the at least one additional data feed acquired from a common sporting event;

identifying one or more distinctive audio events in the one or more audio segments received from the first device and the one or more audio segments received from the at least one additional device;

determining a timing offset between the first data feed and the at least an additional data feed by comparing the one or more distinctive audio events of the one or more audio segments received from the first device to the one or more distinctive audio events of the one or more audio segments received from the at least one additional device with a distinct event correlation procedure, wherein the distinct event correlation procedure comprises:

performing a cross-correlation procedure on the first data feed and the at least one additional data feed including generating a set of correlation results indicative of a degree of overlapping distinct audio events between the first data feed and the at least one additional data feed for each of a plurality of potential offsets;

determining a quantity of distinct event overlap matches between the first data feed and the at least one additional data feed for each of the plurality of potential offsets;

comparing the determined quantity of distinct event overlap matches between the first data feed and the least one additional data feed for each of the plurality of potential offsets to a selected threshold quantity;

responsive to a determination of a quantity of distinct event overlap matches below the selected threshold quantity for one or more potential offsets, eliminating the one or more of the plurality of potential offsets having a quantity of distinct event overlap matches below the selected threshold quantity;

responsive to a determination of a quantity of distinct event overlap matches at or above the selected threshold quantity for the one or more potential offsets, generating a match strength for one or more potential offsets having a quantity of distinct event overlap matches at or above the selected threshold quantity; and determining a matching offset by identifying a potential offset with the highest match strength of the one or more potential offsets having a quantity of distinct event overlap matches at or above the selected threshold quantity, generating a synchronized output feed by establishing a common absolute time for the first data feed and the at least one additional data feed based on the determined timing offset.

17. The method of claim 16, wherein the generating a match strength for one or more potential offsets having a quantity of distinct event overlap matches at or above the selected threshold quantity comprises:

generating a match strength for one or more potential offsets having a quantity of distinct event overlap matches at or above the selected threshold quantity by multiplying a cross-correlation result for the one or more potential offsets by a selected scaling factor.

18. The method of claim 16, further comprising:

determining a level of offset accuracy by comparing a ratio of the cross-correlation result of the determined matching offset and the cross-correlation result of a potential offset having the second highest match strength of the one or more potential offsets.

* * * * *